(12) United States Patent
Hu et al.

(10) Patent No.: US 9,824,486 B2
(45) Date of Patent: Nov. 21, 2017

(54) HIGH RESOLUTION FREE-VIEW INTERPOLATION OF PLANAR STRUCTURE

(71) Applicant: Futurewei Technologies, Inc., Plano, TX (US)

(72) Inventors: Jie Hu, Amhurst, NY (US); Chang Wen Chen, Amhurst, NY (US); Dongqing Zhang, Plainsboro, NJ (US); Hong Heather Yu, Princeton Jct, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 161 days.

(21) Appl. No.: 14/572,524

(22) Filed: Dec. 16, 2014

(65) Prior Publication Data

US 2015/0170405 A1    Jun. 18, 2015

Related U.S. Application Data

(60) Provisional application No. 61/916,700, filed on Dec. 16, 2013.

(51) Int. Cl.
| | |
|---|---|
| *G06T 15/20* | (2011.01) |
| *H04N 5/76* | (2006.01) |
| *G06T 3/40* | (2006.01) |
| *H04N 5/232* | (2006.01) |
| *H04N 5/262* | (2006.01) |

(52) U.S. Cl.
CPC ............. *G06T 15/205* (2013.01); *G06T 3/40* (2013.01); *H04N 5/23238* (2013.01); *H04N 5/2628* (2013.01); *H04N 5/76* (2013.01)

(58) Field of Classification Search
CPC .............................. G06T 15/205; G06T 15/20
See application file for complete search history.

(56) References Cited

U.S. PATENT DOCUMENTS

| | | | | |
|---|---|---|---|---|
| 2004/0218809 | A1* | 11/2004 | Blake | ....................... G06K 9/20 382/154 |
| 2009/0304265 | A1* | 12/2009 | Khan | .................... G06T 7/0067 382/154 |
| 2010/0103175 | A1* | 4/2010 | Okutomi | ............... G06T 3/4053 345/428 |

(Continued)

OTHER PUBLICATIONS

Snavely, Noah, Steven M. Seitz, and Richard Szeliski. "Modeling the world from internet photo collections." International Journal of Computer Vision 80.2 (2008): 189-210.*

(Continued)

*Primary Examiner* — Daniel Hajnik
(74) *Attorney, Agent, or Firm* — Conley Rose, P.C.

(57) ABSTRACT

A method and system is proposed to create a generative model to interpolate any view of a planar scene given a sequence of reference views and a synthesis view that is optimized by the marginalization of photometric regulation, and geometric registration parameters. According to one aspect of the claimed subject matter, a technique is proposed to combine information from varying input camera poses. Planar homography based image super resolution in free view interpolation for planar structure is applied to the combined information. Non-redundant information is combined in such a manner that the high resolution and free view problems in traditional 2D based image-based rendering techniques are overcome.

25 Claims, 7 Drawing Sheets

(56) References Cited

U.S. PATENT DOCUMENTS

2012/0050474 A1* 3/2012 Segall ................ G06T 5/50
　　　　　　　　　　　　　　　　　　　348/43
2013/0016097 A1* 1/2013 Coene ................ G06T 15/205
　　　　　　　　　　　　　　　　　　　345/419

OTHER PUBLICATIONS

Nozick, Vincent, Silvain Michelin, and Didier Arguès. "Real-time plane-sweep with local strategy." (2006).*
Bartoli, Adrien. "Groupwise geometric and photometric direct image registration." IEEE Transactions on Pattern Analysis and Machine Intelligence 30.12 (2008): 2098-2108.*

* cited by examiner

HIGH RESOLUTION FREE-VIEW INTERPOLATION OF PLANAR STRUCTURE

CROSS REFERENCE TO RELATED APPLICATIONS

This application claims the benefit of U.S. Provisional Application 61/916,700 to Hu et al., filed Dec. 16, 2013, which is incorporated by reference herein in its entirety and for all purposes.

BACKGROUND

In many imaging applications, users may wish to access a random viewing angle of a captured scene in high resolution, even when this specifically queried imagery is not among the set of acquired sample images. In theory, 3D reconstruction based rendering can be applied to generate such an (artificial) image. However, accurate camera calibration over large scale photo collections is needed and is highly complex in nature. Image stitching based approaches, such as panorama imaging, can also be applied. However, such schemes are unable to provide free view interpolation or resolution enhancement.

Image-based rendering (IBR) is a technique that renders novel views of the scene given a set of images, and has long been studied in computer graphics and computer vision. With the rapid progress and extensive deployment of mobile devices in recent years, there is strong consumer interest in developing light weight algorithms capable of high quality free-view interpolation with zoom-in/out effects given limited uncalibrated views.

Two widely used approaches for IBR are 3D points cloud reconstruction and image stitching, respectively. The resolution of the synthesized view of 3D reconstruction based IBR depends highly on the accuracy of the recovered points cloud. In this case, a large number of reference images from varying views are required for calibration. For image stitching based IBR, even though strict controls over camera positions are usually required, serious artifacts may still occur at the seam because of the ignorance of depth and view disparity during image registration, and due to the non-redundant information in the overlapping area of adjacent frames. Both approaches suffer from several unresolved issues when high resolution free view interpolation is desired. This is particularly true for mobile devices when limited computation resources are available and the acquisition of reference images cannot be properly controlled. In general, mobile users prefer to render a novel view of scene within a short time, based on a few available views, either taken by users themselves or acquired from the Internet.

To determine where a point appears in a specific view given its positions in a set of images, one straightforward and common way is to register all camera poses, reconstruct the 3D scene, and then project the 3D point onto the desired view. For example, where techniques for registration and rendering large scale photo collections are involved, the method may include interactively browsing and exploring large, unstructured collections of photographs. More robust 3D Six Degrees of Freedom (6DOF) registration and scene specific controls can be achieved by related techniques. The precise calibration of full 3D camera poses for all reference images is achieved by leveraging structure-from-motion algorithms with high time complexity, in which multi-core GPUs have been proposed. However, the acquisition and calibration of large scale photo collections is still a huge challenge for users with limited resource and real time needs.

Image stitching based IBR, on the other hand, usually has low time complexity, and is available even in consumer cameras, for example, to obtain a panorama shot. However, control over images is usually required for panorama generation. For standard panoramas, for example, all images are assumed to maintain the same camera center and to compose a wide field of view. On the other hand, for multi-perspective panoramas, reference images are required to correspond to a specific orbit, although the final mosaic combines views from different directions. To minimize the artifacts caused primarily by the disparities between images, dense scene depth can be estimated and structure-from-motion algorithms have also been employed for registration and determination of projection surfaces. For both types of panoramas, proper segments are cropped, registered and stitched. Unfortunately, high resolution with free view has heretofore been virtually impossible to achieve, since the redundant information in the overlapping areas of adjacent views are typically not used for anything other than seam smoothing.

When limited in planar structure, 2D based high resolution free view interpolation can be regarded as a special case of general Super Resolution (SR) problem in 3D space. Super Resolution has long been studied to generate high resolution image by combining the non-redundant information from multiple low-resolution images. Image registration and SR are often treated as distinct and sequential processes. More recently, a Bayesian approach has been developed to estimate SR by optimizing the marginal probability of the observed low-resolution images directly. Lower memory requirements and sharper results are reported by integration over the point-spread function (PSF) and motion parameters. However, all previous SR methods can only treat slight rotation and translation over reference images. These registration schemes would fail when there is disparity in either depth, pitch, or yaw in reference images.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

As a solution to the problems noted above inherent to traditional image-based rendering techniques, the present disclosure describes a novel free view image super-resolution scheme by applying Lie group theory to 3D space to interpolate free view for planar structures. A Bayesian model is constructed for marginalizing over photometric regulation and geometric registration parameters. The proposed scheme is able to achieve desired performance against the state-of-the-art image super-resolution approaches and successfully obtain registration in full 6 degrees-of-freedom (6DOF). Compared to existing image based rendering schemes, embodiments of the present disclosure achieves free view interpolation for planar structures with higher resolution and less distortion.

According to an aspect of the present disclosure, a novel IBR scheme is described, whereby free view interpolation can be provided for planar structures given uncontrolled, limited number of input images. To obtain the position and intensity for each point in the synthesis image, instead of re-projecting from the 3D model or making copy from the original images, it is formulated as a super-resolution (SR) problem with desired registration in full 6DOF. According to one or more embodiments, a Bayesian approach is employed to determine the SR image given multiple low resolution images. To solve the challenge when significant disparities exist between reference views, the Lie group theory is applied to the Bayesian model to implement the optimization on geometric registration together with photometric regulation. With such optimization, this scheme is able to realize any zoom-in and zoom-out as well as rotation effects of the scene based on only limited views.

According to a second aspect of the present disclosure, a solution is provided for the image SR problem in full 6DOF. In contrast with general SR methods that can only treat slight rotation and translation in reference images, the scheme according to the present disclosure can handle scale change and 3D transformation effectively. According to one or more embodiments, a novel IBR scheme derived from image SR problem is disclosed. The scheme can generate free view interpolation for planar structures with higher resolution and less distortion using limited uncontrolled input images that is different from either 3D reconstruction or image stitching based IBR.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE INVENTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although steps and sequencing thereof are disclosed in figures herein describing the operations of this process, such steps and sequencing are exemplary. Embodiments are well suited to performing various other steps or variations of the steps recited in the flowchart of the figure herein, that not all of the steps depicted may be performed, or that the steps may be performed in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The claimed subject matter is directed to a novel free view image super-resolution scheme by applying Lie group theory to 3D space to interpolate free view for planar structures. A Bayesian model is constructed for refining (re-calculating) photometric regulation and geometric registration parameters. The proposed scheme is able to achieve desired performance against the state-of-the-art image super-resolution approaches and successfully obtain registration in full 6 degrees-of-freedom (DOF). Compared to existing image based rendering schemes, embodiments of the present disclosure achieves free view interpolation for planar structure with higher resolution and less distortion.

According to the present disclosure, a novel IBR scheme is described, whereby free view interpolation can be provided for planar structures given uncontrolled, limited number of input images. To obtain the position and intensity for each point in the synthesis image, instead of re-projecting from the 3D model or making copy from the original images, it is formulated as a super-resolution (SR) problem with desired registration in full 6DOF. A Bayesian approach is employed to determine the SR image given multiple low resolution images. To solve the challenge when significant disparities exist between reference views, the Lie group theory is applied to the Bayesian model to implement the optimization on geometric registration together with photometric regulation parameters. With such optimization, this scheme is able to realize any zoom-in and zoom-out as well as rotation effects of the scene based on only limited views.

Figure 1A:
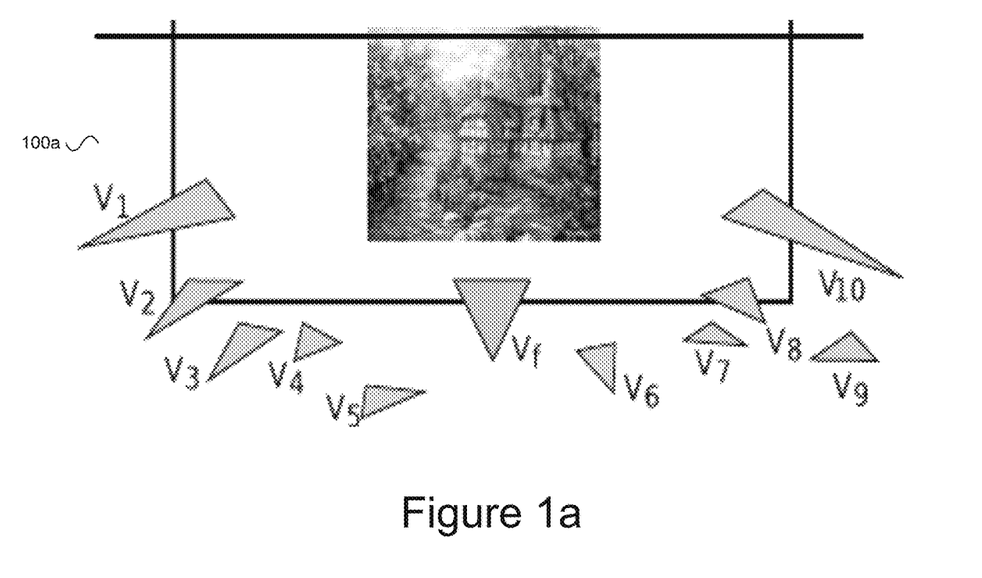
FIG. 1a depicts a diagram that illustrates the goal to generate an exemplary high resolution free view interpolation of a planar structure, in accordance with embodiments of the present invention.
Figure 1B:
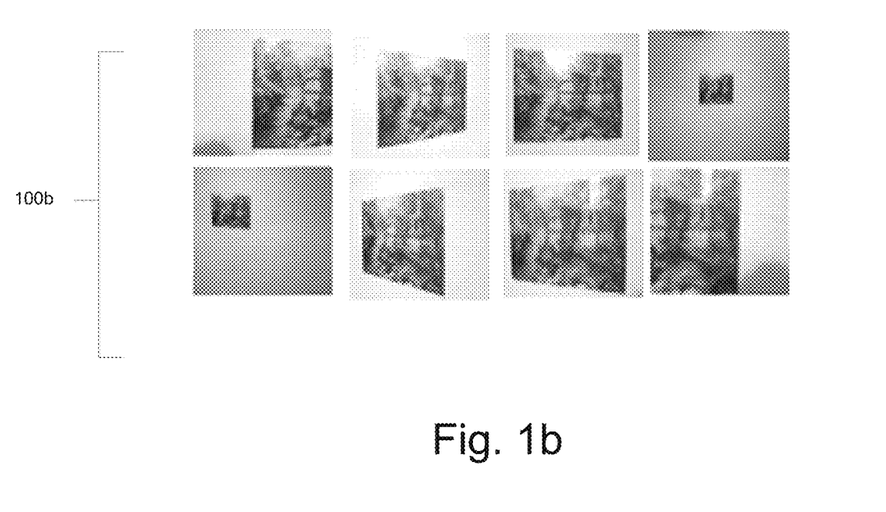
FIG. 1b illustrates multiple exemplary input views corresponding to the scene depicted in FIG. 1a, in accordance with embodiments of the present invention.
Figure 2:
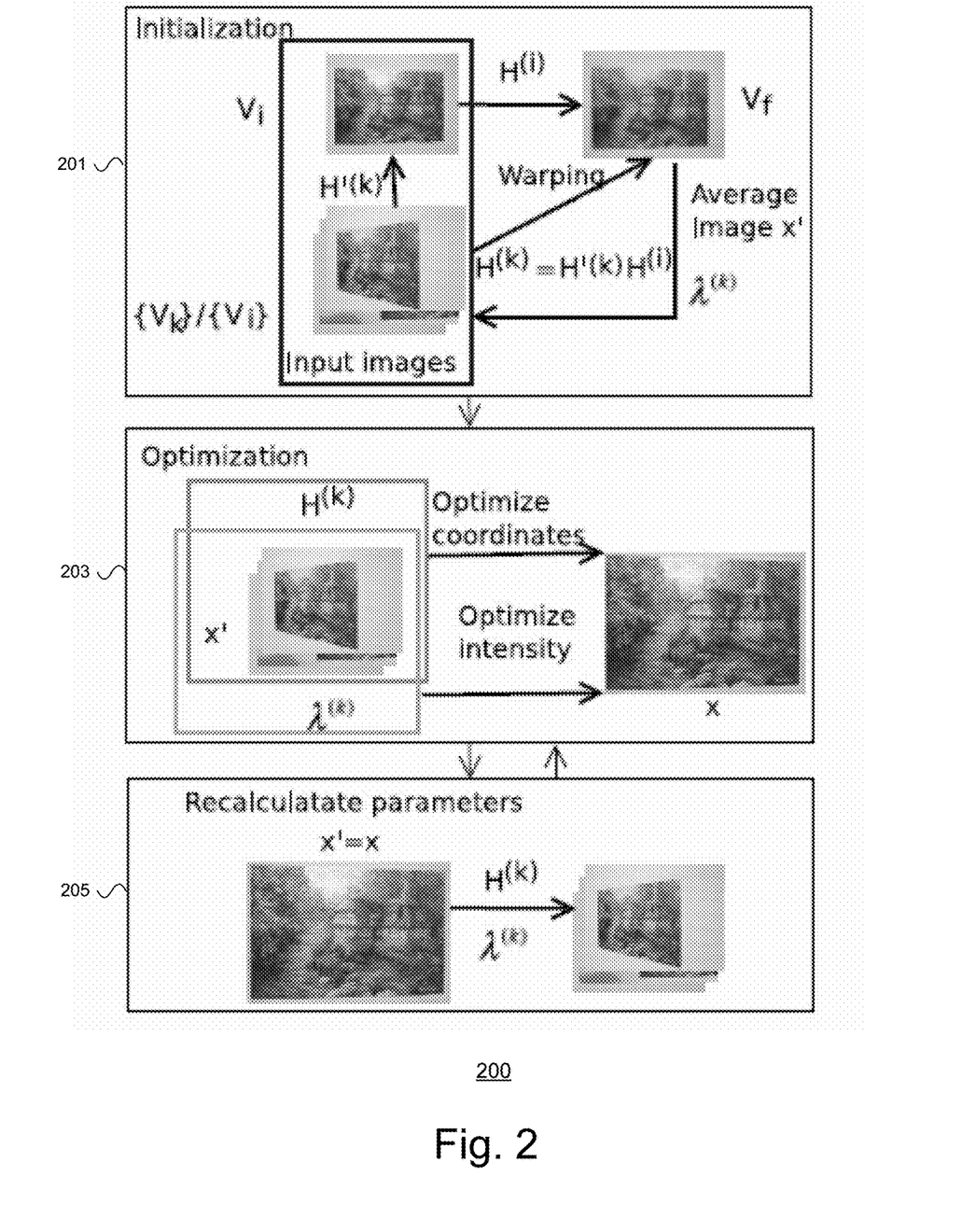
FIG. 2 depicts a flowchart to generate an exemplary high resolution free view interpolation of a planar structure, in accordance with embodiments of the present invention.

FIGS. 1a, 1b, and 2 illustrate an overview of an exemplary high resolution free view interpolation process in accordance with an embodiment of the present disclosure. FIG. 1a depicts a diagram 100a that illustrates the goal to generate any free view of the scene $V_f$ given a set of views of a planar scene ($V_1$-$V_{10}$). FIG. 1b illustrates multiple exemplary input views 100b corresponding to the scene $V_f$ depicted in FIG. 1a. FIG. 2 depicts a flowchart 200 for the proposed scheme.

As depicted in FIG. 1a, novel (or "synthesis") view $V_f$ of a planar scene can be interpolated from a given set of views ($V_1$-$V_{10}$) from different angles and depths as demonstrated in FIG. 1b. In one or more embodiments, $V_f$ can be any view such as panorama or a normal view that is not available or captured (for example, famous paintings are not always allowed to be captured from a relatively short distance in museums). The flowchart 200 of the proposed scheme is depicted in FIG. 2. As presented in FIG. 2, reference images are initialized at step 201. Initialization may include, for example, registration of the reference images by planar homography in full 6DOF and the generation of a pre-estimated image that includes a synthesis image of the reference images. In one or more embodiments, the synthesis image may be initially generated using a homography transformation of one of the reference images, and an average of color intensity values of the input images. Subsequently, the synthesis image undergoes an optimization process 203 that includes optimization of pixel coordinates and intensities of the synthesis image. Finally, new synthesis images are generated at step 205 by iteratively re-calculating geometric registration and photometric regulation parameters to refine the synthesis image. The main optimization process is based on a Bayesian generative model, which will be described below in greater detail.

In one or more embodiments, the super-resolution (SR) image is obtained by optimizing posterior distribution marginalized over rotation and translation as well as intensity parameters in the Bayesian model. A Bayesian model is adopted in the present disclosure for transformation in full 6DOF by introducing properties of the Lie group and optimizations in positions and intensity are formulated as two separate processes. With adopted registration, it is not necessary to exercise strict controls over positions of input images. Instead, it is possible to simply crop and stitch patches as traditional image stitching based IBR. Reconstructing high resolution free view is accomplished by combining information from limited views directly, in order to avoid processing large scale photo collections during 3D reconstruction.

The following sections describe in detail an embodiment of the present disclosure, which employs the proposed Bayesian model for high resolution free view interpolation. The generative model, the marginalization over photometric and regulation parameters, and the optimization procedure are presented with reference to the embodiments in detail.

Projection of the planar structure on a requested view is determined by its K available views. Assume x=(v,h) to be a set of pixels in the image of a requested view with size N, where $v=[v_1, \ldots, v_N]^T$ is an N×2 vector corresponding to coordinates of the image and h represents intensity with the dimension N×1 (which can be extended to RGB image straightforwardly). Similarly, reference pixels of x in view k is represented as $y^{(k)}=(w^{(k)}, g^{(k)})$ with $w^{(k)}=[w_1^{(k)}, \ldots, w_N^{(k)}]^T$ (N×2) and $g^{(k)}$ (N×1) representing coordinates and intensity, respectively. The relationships between x and $\{y^{(k)}\}$ are governed by the set of planar homography matrices $\{H^{(k)}\}$ and photometric regulation parameters $\{\lambda^{(k)}\}$.

Assuming $v_i$ and $w_i^{(k)}$ are coordinates of one pixel in the requested view and its reference coordinate in view k, $\underline{w}_i^{(k)}$ and $\underline{v}_i$ are used to represent the homogeneous coordinates for $w_i^{(k)}$ and $v_i$. With planar homography $H^{(k)}$ and Gaussian i.i.d. noise added to each dimension of the homogeneous coordinate, the coordinate transformation can be expressed as, $$\underline{w}_i^{(k)} = H^{(k)} \underline{v}_i + \epsilon_v^{(k)} \tag{1}$$

where $$\epsilon_v^{(k)} \sim N\left(0, \sum_1\right), \Sigma_1 = \begin{bmatrix} a^{-1} & 0 & 0 \\ 0 & b^{-1} & 0 \\ 0 & 0 & c^{-1} \end{bmatrix} \tag{2}$$

A linear regulation and also a Gaussian i.i.d. noise are used to represent the intensity relationships of the same scene points projected in different views. Ignoring the PSF, all reference views are of proper resolution, with the intensity g being expressed as:

$$g^{(k)} = \lambda_\alpha^{(k)} h + \lambda_\beta^{(k)} e + \epsilon^{(k)} \tag{3}$$

$$\epsilon^{(k)} \sim N(0, \beta^{-1}I)$$

where e is a N×1 vector with all values equal to 1.

In one or more embodiments, the homography $H^{(k)}$ can be calculated by extracting and matching SIFT points in both images and conducting direct linear transformation (DLT) using a random sample consensus (RANSAC) method, where x' is the pre-estimated representation of x and given x' and $y^{(k)}$. Photometric regulation parameters $\{\lambda^{(k)}\}$ can be expressed as $\lambda^{(k)}=[\lambda_\alpha^{(k)} \lambda_\beta^{(k)}]^T$, and can be calculated by linear regression given the intensities of corresponding pixels.

Figure 3:
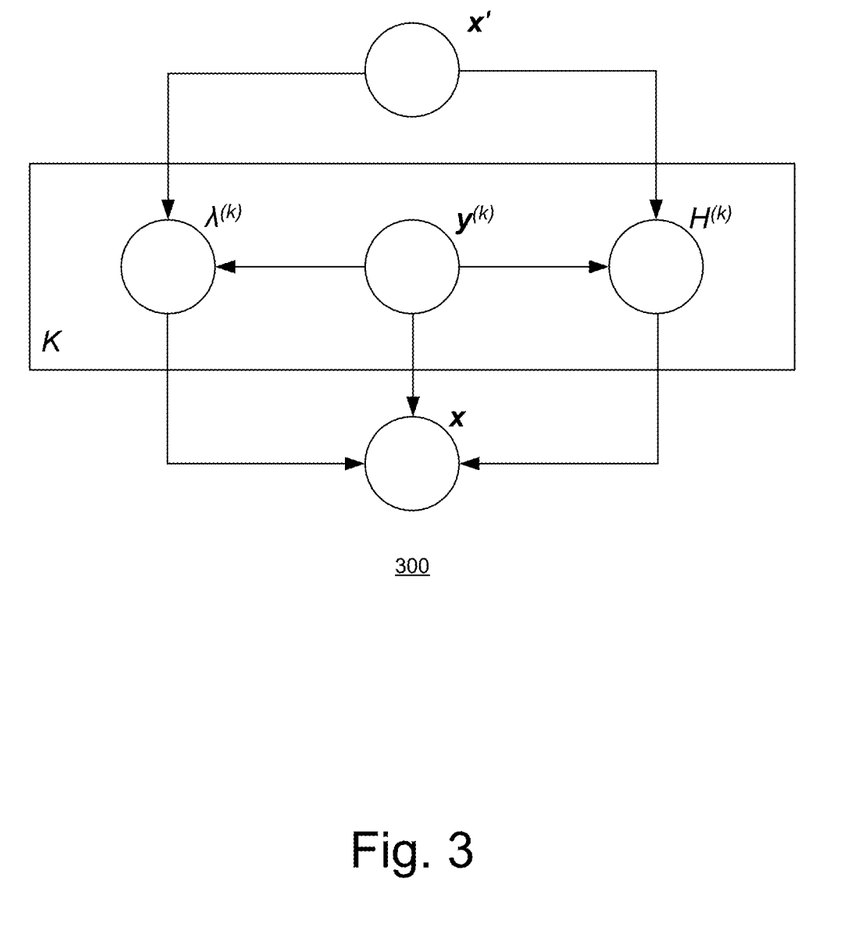
FIG. 3 illustrates an exemplary directed graph model, in accordance with embodiments of the present invention.

FIG. 3 illustrates an exemplary directed graph model 300 corresponding to the joint distribution of x', $\{y^{(k)}\}$, $\{H^{(k)}\}$, $\{\lambda^{(k)}\}$ and x. As depicted in FIG. 3, x', the pre-estimated representation of x, is jointly distributed to photometric regular parameters $\lambda^{(k)}$, and homography matrix $H^{(k)}$ for each of the K available views. Reference pixels $y^{(k)}$ for a k view of the K available views is likewise jointly distributed to the photometric regulation parameters $\lambda^{(k)}$ and the homography matrix $H^{(k)}$, and combined with both to derive synthesis views of x, the set of pixels in the required image.

Given pre-estimated x' and $\{y^{(k)}\}$, the joint distribution of geometric registration $\{H^{(k)}\}$, photometric regulation $\{\lambda^{(k)}\}$ parameters and the new synthesis view x will be $$p(x, \{H^{(k)}, \lambda^{(k)}\} | \{y^{(k)}\}, x') = \quad (4)$$

$$p(x | \{y^{(k)}, \lambda^{(k)}, H^{(k)}\}) \prod_k p(\lambda^{(k)} | x', y^{(k)}) \prod_k p(H^{(k)} | x', y^{(k)})$$

To obtain the new synthesis view, $\{H^{(k)}\}$ and $\{\lambda^{(k)}\}$ are re-calculated in an integral form and the conditional distribution is calculated to obtain transformation.

$$p(x | \{y^{(k)}\}, x') = \int \cdots \int p(x | \{y^{(k)}, \lambda^{(k)}, H^{(k)}\}) \quad (5)$$

$$\prod_k p(\lambda^{(k)} | x', y^{(k)}) \prod_k p(H^{(k)} | x', y^{(k)}) d\{H, \lambda\}$$

$$= \frac{p(x)}{p(y^{(k)})} \int \cdots \int \prod_k p(y^{(k)} | x, \lambda^{(k)}, H^{(k)})$$

$$p(\lambda^{(k)} | x', y^{(k)}) p(H^{(k)} | x', y^{(k)}) d\{H, \lambda\}$$

Assuming each pixel's coordinate is independent with its intensity, Equation (5) is decomposed into multiplication of distribution for both parts.

$$p(x | \{y^{(k)}\}, x') = \frac{p(h)}{p(\{g^{(k)}\})} \prod_k \int p(g^{(k)} | h, \lambda^{(k)}) p(\lambda^{(k)} | x', y^{(k)}) d\lambda^{(k)} \quad (6)$$

$$\frac{p(v)}{p(\{w^{(k)}\})} \prod_k \int p(w^{(k)} | v, H^{(k)}) p(H^{(k)} | x', y^{(k)}) dH^{(k)}$$

In one or more embodiments, the new synthesis image x is determined given x' and $\{y^{(k)}\}$ by searching for the intensity and the coordinates with the highest probability, respectively.

From Equation (3), for each individual view, given requested view and intensity regulation parameters, the likelihood can be expressed as:

$$p(g^{(k)} | h, \lambda^{(k)}) \propto \exp\left\{-\frac{\beta}{2} \sum_{n=1}^N \left(g_n^{(k)} - \lambda_\alpha^{(k)} h_n - \lambda_\beta^{(k)}\right)^2\right\} \quad (7)$$

where $h_n$ is the intensity value for the nth pixel.

According to one or more embodiments of the present disclosure, $\delta^{(k)}$ is used to represent the difference between the real photometric regulation parameters $\lambda^{(k)}$ and its estimated values $\lambda^{(k)}$ where $\delta^{(k)} \sim N(0,C)$ and $C=y^{-1}I$.

$$\begin{bmatrix} \lambda_\alpha^{(k)} \\ \lambda_\beta^{(k)} \end{bmatrix} = \begin{bmatrix} \overline{\lambda}_\alpha^{(k)} \\ \overline{\lambda}_\beta^{(k)} \end{bmatrix} + \delta^{(k)} \quad (8)$$

$$p(\lambda^{(k)} | x', y^{(k)}) = \left(\frac{|C^{-1}|}{(2\pi)^n}\right)^{\frac{1}{2}} \exp\left\{-\frac{1}{2} \delta^{(k)T} C^{-1} \delta^{(k)}\right\} \quad (9)$$

The negative exponent term of (7) can then be a function of $\delta^{(k)}$ and approximated by the second-order Taylor series.

$$e^{(k)}(\delta^{(k)}) = \frac{\beta}{2} \sum_{n=1}^N \left(g_n^{(k)} - \lambda_\alpha^{(k)} h_n - \lambda_\beta^{(k)}\right)^2 \quad (10)$$

$$= F^{(k)} + L^{(k)T} \delta^{(k)} + \delta^{(k)T} M^{(k)} \delta^{(k)}$$

In one or more embodiments, Huber prior is used for prior distribution of intensity, $$p(h) = \frac{1}{Z_z} \exp\left\{-\frac{v}{2} \rho(Dx, \alpha)\right\} \quad (11)$$

$$p(z, \alpha) = \begin{cases} z^2, & \text{if } |z| < \alpha \\ 2\alpha|z| - \alpha^2 & \text{otherwise} \end{cases}$$

where Dx is the gradient of x. and $\alpha$ and v are parameters of the Huber potential function. In one or more further embodiments, Zx is the partition function.

The photometric regulation part of (6) can then be derived as follows, assuming $S^{(k)} = M^{(k)} + \frac{1}{2} C^{-1}$:

$$p(h) \prod_k \int p(g^{(k)} | h, \lambda^{(k)}) p(\lambda^{(k)} | x', y^{(k)}) d\lambda^{(k)} \propto \quad (12)$$

$$\exp\left\{-\frac{v}{2} \rho(Dx, \alpha)\right\} \prod_k \exp\{F^{(k)}\} \int \exp\{L^{(k)T} - \delta^{(k)T} S^{(k)} \delta^{(k)}\} d\delta^{(k)} =$$

$$(2\pi)^{\left(\frac{N}{2}\right)} |S^{(k)}|^{-\frac{1}{2}} \exp\left\{-\frac{v}{2} \rho(Dx, \alpha) F^{(k)} \cdot \frac{1}{4} L^{(k)T} S^{(k)-1} L^{(k)}\right\}$$

Similar to the derivations described above, the likelihood given requested view and registration parameters can be derived from (1) and (2):

$$p(w^{(k)} | v, H^{(k)}) \propto \quad (13)$$

$$\exp\left\{1 - \frac{1}{2} \sum_{n=1}^N (w_n^{(k)} - H^{(k)} v_n)^T \sum_1^{-1} (w_n^{(k)} - H^{(k)} v_n)\right\}$$

Since the planar homography $H(k) \in SL(3)$—which is a space of 3×3 real matrices with 8-DOF belonging to the Lie group—the difference between the real registration matrix $H(k)$ and its estimation $\hat{H}(k)$ can be expressed as follows:

$$\overline{H}^{(k)-1} H^{(k)} = e^{G^{(k)}} = I + \sum_n^\infty \frac{1}{n!} G^{(k)n} \approx I + G^{(k)} \quad (14)$$

with the Gaussian distribution of $H^{(k)}$ on SL(3) is defined as:

$$p(H^{(k)} | x', y^{(k)}) \propto \exp\left\{-\frac{1}{2} f(G^{(k)})^T \sum_2^{-1} f(G^{(k)})\right\} \quad (15)$$

where f: sl(3)→$\mathbb{R}^8$ is a mapping that projects the tangent space of SL(3) to an 8 dimensional space and $\Sigma_2 = d^{-1} I$ is a 8×8 diagonal matrix.

In one or more embodiments, assuming $X^{(k)} = f(G^{(k)})$ is an 8×1 vector, the negative exponent term of (13) can be approximated by a second-order Taylor series over $X^{(k)}$ expressed as:

$$e(X^{(k)}) = \frac{1}{2} \sum_{n=1}^{N} (\underline{w}_n^{(k)} - H^{(k)} \underline{v}_n)^T \sum_{1}^{-1} (\underline{w}_n^{(k)} - H^{(k)} \underline{v}_n) \quad (16)$$
$$= F^{(k)} + \tilde{L}^{(k)T} + X^{(k)T} \tilde{M}^{(k)} X^{(k)}$$

Since the coordinates of the synthesis view are uniformly distributed, p(v) can be considered as constant.

The geometric registration part of (6) can then be derived as follows, assuming $\overline{S}^{(k)} = \underline{M}^{(k)} + \frac{1}{2}\Sigma_2^{-1}$:

$$P(v) \prod_k \int p(w^{(k)} | v, H^{(k)}) p(H^{(k)} | x', y^{(k)}) dH^{(k)} \propto \quad (17)$$
$$(2\pi)^{\frac{N}{2}} |\overline{S}^{(k)}|^{-\frac{1}{2}} \exp\left\{\overline{F}^{(k)} \cdot \frac{1}{4} \overline{L}^{(k)T} \overline{S}^{(k)-1} \overline{L}^{(k)}\right\}$$

letting $\mathcal{L}$ be the objective function as the log of (6) and neglecting the constant terms leaves:

$$\mathcal{L} = \frac{v}{2}\rho(Dx \cdot \alpha) + \sum_{k=1}^{K} \left[F^{(k)} + \frac{1}{2}\log|S^{(k)}| - \right. \quad (18)$$
$$\left. \frac{1}{4}L^{(k)(T)}S^{(k)-1}L^{(k)} + \tilde{F}^{(k)} + \frac{1}{2}\log|\tilde{S}^{(k)}| - \frac{1}{4}\tilde{L}^{(k)T}\tilde{S}^{(k)-1}\tilde{L}^{(k)}\right]$$

This objective function can be optimized using bounded quasi-Newton method of BFGS (L-BFGS-B). The gradients of $\mathcal{L}$ over h and v can be expressed as $$\frac{d\mathcal{L}}{dh} = \frac{v}{2} D^T \frac{d}{dDx} \rho(Dx) + \quad (19)$$
$$\sum_{k=1}^{K} \left\{ \frac{dF^{(k)}}{dh} - \frac{1}{2} L^{(k)T} S^{(k)-1} \frac{dL^{(k)}}{dh} + \left[\frac{1}{2} vec(S^{-1})^T + \right.\right.$$
$$\left.\left. \frac{1}{4}(L^{(k)T}S^{(k)-1} \otimes L^{(k)T}S^{(k)-1})\right] \frac{dvecS^{(k)}}{dh}\right\}$$

$$\frac{d\mathcal{L}}{dv} = \sum_{k=1}^{K} \left\{ \frac{d\tilde{F}^{(k)}}{dv} - \frac{1}{2} \tilde{L}^{(k)T} \tilde{S}^{(k)-1} \frac{d\tilde{L}^{(k)}}{dv} + \left[\frac{1}{2} vec(\tilde{S}^{-1})^T + \right.\right. \quad (20)$$
$$\left.\left. \frac{1}{4}(\tilde{L}^{(k)T}\tilde{S}^{(k)-1} \otimes \tilde{L}^{(k)T}\tilde{S}^{(k)-1})\right] \frac{dvec\tilde{S}^{(k)}}{dv}\right\}$$

F, L, S, $\overline{F}$, $\overline{L}$, $\overline{S}$ and their gradients can be obtained analytically.

The process above is depicted in the flowchart of FIG. 2. Initially, the planar homography between all reference views is calculated and a synthesis view is generated at step 201. In one or more embodiments, the synthesis view may be generated based on photometric regulation and geometric registration parameters derived from reference views (input images). Geometric registration parameters (including, for example, one or more planar homography transformation matrices between the reference views) may be calculated by using SIFT matching and assuming the synthesis view is transformed from one reference view. Thereafter, the planar homography between the synthesis view and all reference views is obtained at step 203 to optimize the pixel intensities and coordinates of the synthesis view. In one embodiment, photometric regulation parameters include color and intensity values for pixels in the synthesis image. The initial intensity for each pixel in the synthesis view may be determined based on the average of all reference pixels. Subsequently, the initial photometric regulation parameters and geometric registration parameters are iteratively recalculated at step 205 to refine the generated synthesis image. In one or more embodiments, the photometric regulation parameters may be re-calculated using linear regression.

When the synthesis image is large and each pixel can only find reference pixels in partial of reference views, the performance may be influenced if all pixels of the image are considered at one time. In the presented embodiments, an image for the requested view is synthesized slit by slit. That is to say, positions and intensity for pixels in the same column may be optimized at the same time. After all pixels of the image are refined geometric registration $\{H^{(k)}\}$ and photometric regulation $\{\lambda^{(k)}\}$ parameters are recalculated, and a new synthesis image is generated based on the re-calculated parameters Exemplary results obtained from application of an exemplary high resolution free view interpolation process in accordance with embodiments of the present disclosure on three different sample datasets are presented herein: text for image SR reconstruction, a self-collected jigsaw puzzle dataset and a planar structure of a video sequence for long scene panorama. Intensity and coordinate values are normalized in the experiments. In one or more embodiments, the results obtained are insensitive to the parameter setting. The parameters that perform well on all datasets are set as follows: the Huber parameter a is fixed at 0.01 and v is set to 1. Intensity values may differ a lot from image to image because of the distinction in lighting conditions, so a larger variance is selected for their distribution comparing with registration parameters. The variance for the distribution of intensity value β and γ are set to 5 and the variance for the distribution of registration parameters a, b, c and d are set to 0.1. As demonstrated for experiments on image super-resolution dataset, the presented scheme not only can compete with the state-of-the-art SR methods but also can achieve image registration in full 6DOF.

FIGS. 4(a)-(g) shows exemplary results 400 on a text sequence from MDSP SR and demosaicing datasets, which contains 30 uncompressed low resolution grayscale frames of size 57×49. As depicted in FIG. 4, sequence 400 includes (a) 1/30 low resolution frame; (b) average of input images after feature matching based registration; (c) bi-cubic interpolation image; (d) result by Bayesian SR; (e) results by the proposed scheme; (f) result by Bayesian SR when enrolling scale change and 3D rotation; (g) results by the described scheme when enrolling scale change and 3D rotation.

Figure 4:
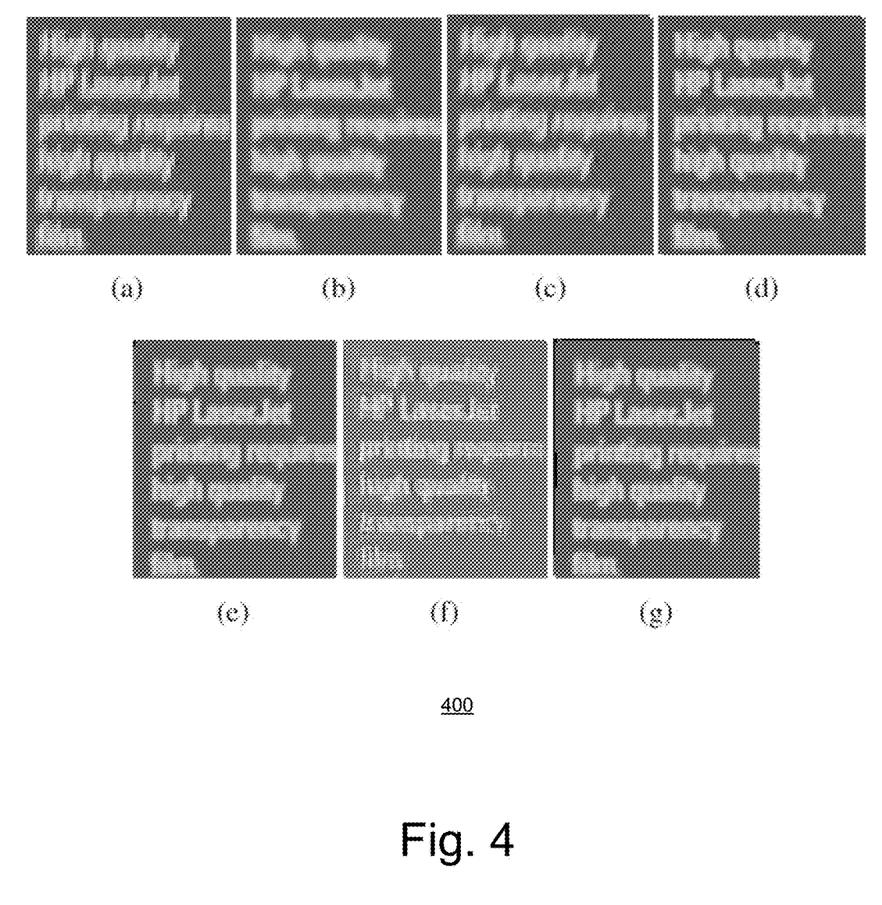
FIG. 4 shows exemplary results on a text sequence, in accordance with embodiments of the present invention.

In one or more embodiments, FIG. 4(a) may be one of these 30 input frames. FIGS. 4(b)-(g) present results by increasing the resolution with a factor 2. To set up the baseline, the homography is calculated between frames through SIFT feature matching and the average all input frames after registration as FIG. 4(b). The bicubic interpolation image (depicted as FIG. 4(c) is calculated as well.

The comparison between the Bayesian super-resolution and an embodiment of the present disclosure on the text sequence are depicted in FIG. 4(d) and FIG. 4(e). The proposed scheme exhibits competent sharp results that compares favorably to the Bayesian SR scheme. Another group of experiments are carried out by enrolling scale change and rotation along all 3 axes in the original text sequence. The results from a comparison between Bayesian SR in accordance with the prior art and the present disclosure is shown as FIG. 4(f) and FIG. 4(g). Marginalizing over 3D planar homography, the scheme according to the present disclosure can still obtain sharp results, while the results by Bayesian SR become blurred since only 2D rotation and translation is considered.

Figure 5:
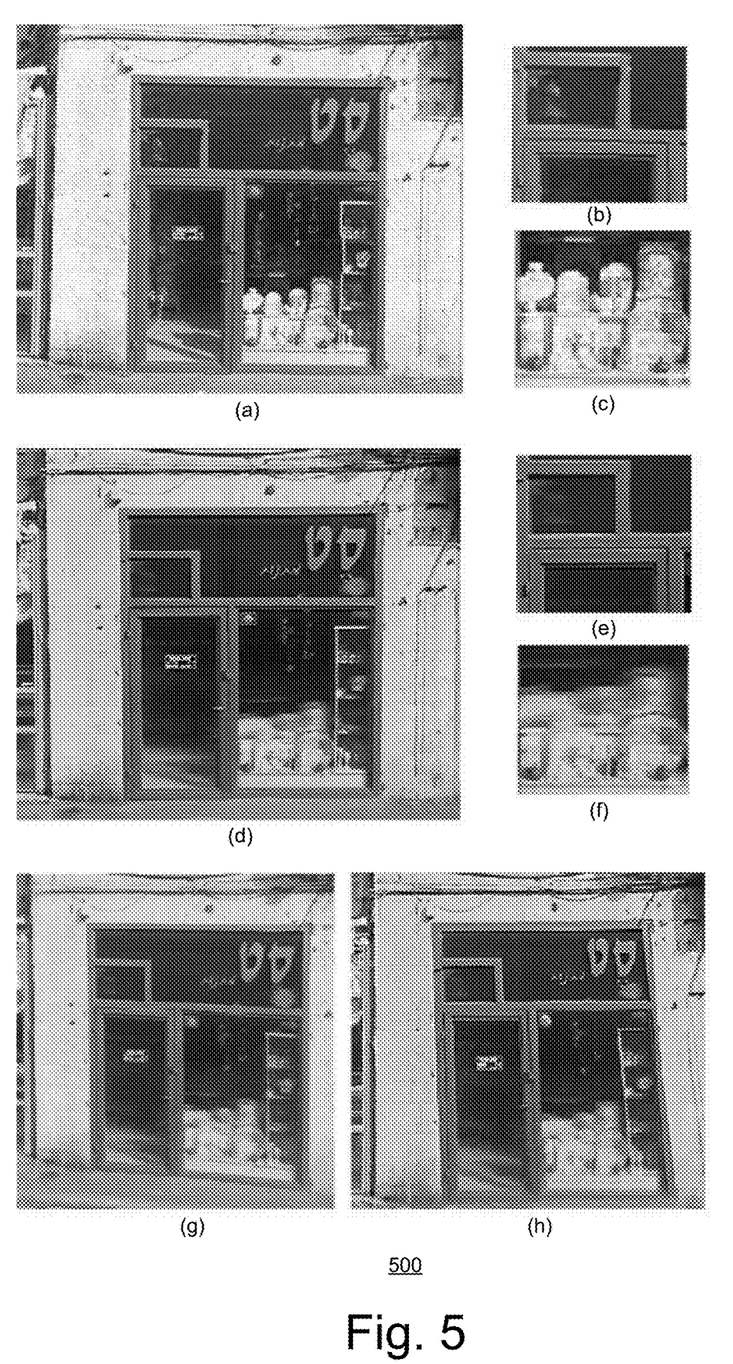
FIG. 5 depicts exemplary images of a scene panorama view interpolation on planar structures of an exemplary video sequence, in accordance with an embodiment of the present disclosure.

FIG. 5 illustrates an resulting image 500 of scene panorama view interpolation on planar structures of an exemplary video sequence in accordance with an embodiment of the present disclosure. As presented in FIG. 5, the video sequence consists of 1800 frames with each frame being 360×240 pixels in size. Selected frames from the video sequence are extracted and the results depicted in FIG. 5. The results of image-based rendering with high resolution free view interpolation methods as described herein are depicted in FIGS. 5(d)(e)(f), juxtaposed with results from minimal aspect distortion (MAD) mosaicing methods (depicted in FIGS. 5(a)(b)(c)). MAD mosaicing uses dense depth to minimize the geometrical distortions, which gives excellent performance for long scene with varying depths. However, it is clear that the distortion at the seam between two cropped patches is still hard to avoid, even though the two cropped patches belong to the same plane. The proposed scheme described herein successfully overcomes the distortion at the frame of the door, comparing results in FIG. 5(b) and FIG. 5(e). FIG. 5(c) and FIG. 5(f) depict an inside view of the room. FIG. 5(g) and FIG. 5(h) present views with focus axis rotated 10° along the vertical and horizontal axes from perpendicular to the wall. Since the long panorama by MAD is the pure combination of patches of input images, higher resolution as well as view change cannot be achieved.

Figure 6A:
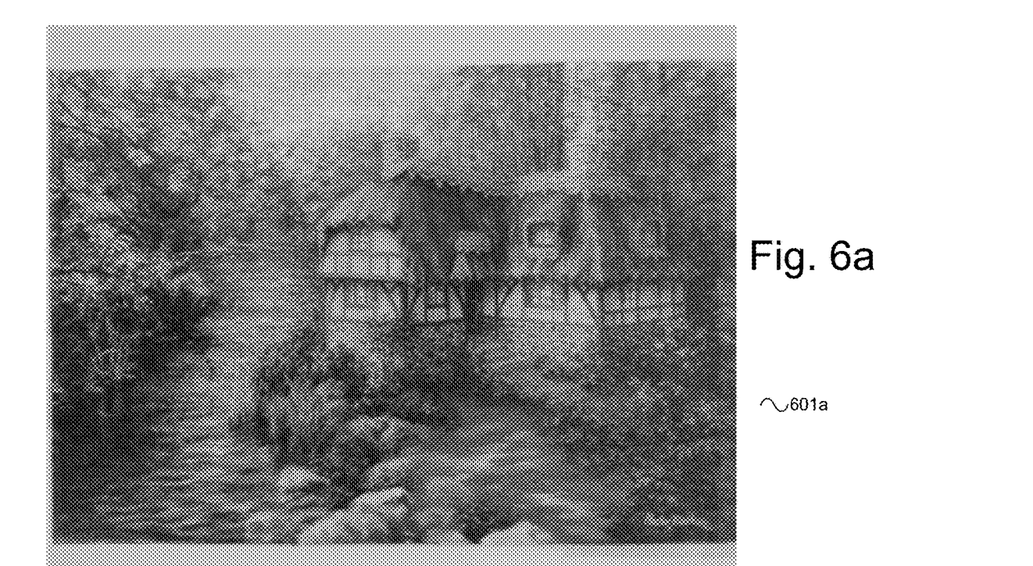
FIG. 6a depicts an exemplary Jigsaw puzzle dataset, in accordance with embodiments of the present invention.
Figure 6B:
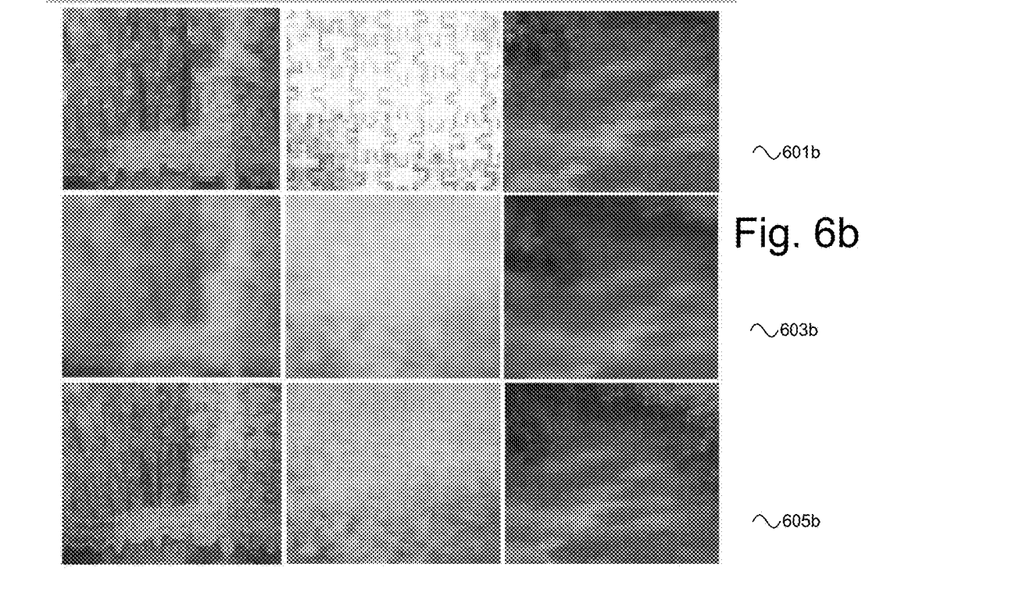
FIG. 6b depicts exemplary results between input frames, an average image, and the image generated using high resolution free view interpolation, in accordance with embodiments of the present invention.

FIG. 6a illustrates an exemplary Jigsaw puzzle dataset 601a containing twenty four (24) 400×300 images of a completed jigsaw puzzle which is hung on a white wall in accordance with an embodiment of the present disclosure. The 24 images are captured from varying angles and depths, that may contain incomplete information required for novel view synthesizing. As depicted in FIG. 6a, the positions and images of certain viewpoints are similar to the positions and images of corresponding viewpoints described above with respect to FIG. 1. The interpolated view $V_f$ with size 800× 600 by the proposed scheme is shown in FIG. 6a with the requested pose, correct intensity and clear edge. The comparison results on enlarged details are shown in FIG. 6b. Selected patches of input views are presented in the first row 601b of FIG. 6b, exhibiting low resolution and noise such as reflection or shadow. For a baseline, the average image is obtained by registering over all input images using SIFT matching. Blurring effects and double edges of jigsaw puzzle pieces are shown in the second row 603b of FIG. 6b due to registration errors. The results are shown in the third row 605b of FIG. 6b, which shows clear piece edges and correct intensity without disturbance by reflection, benefiting from marginalization over planar homography and photometric regulation.

Figure 7:
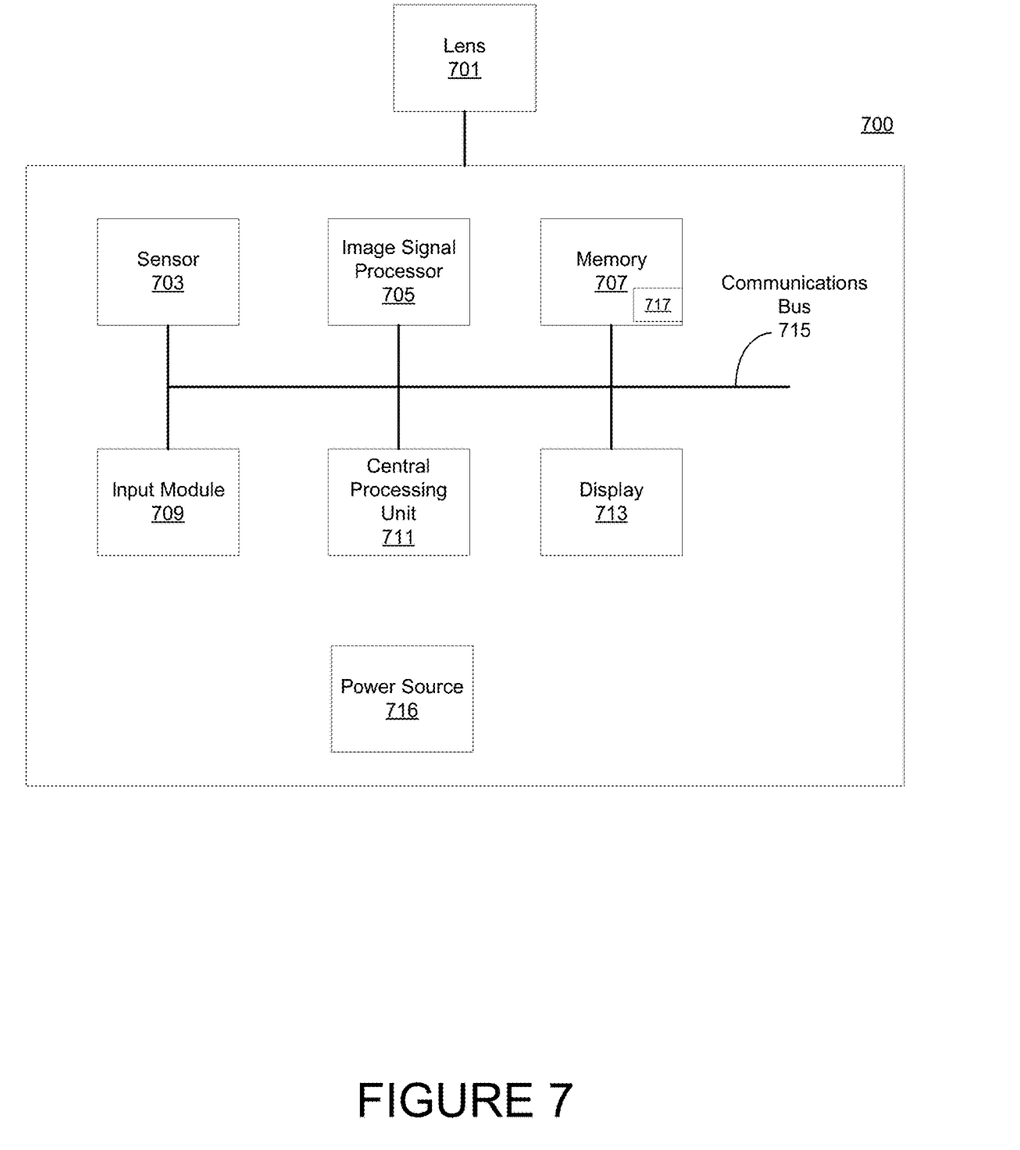
FIG. 7 depicts an exemplary operating environment upon which embodiments of the present disclosure may be implemented.

Embodiments of the claimed subject matter are directed to methods and systems for image rendering using a high resolution free view interpolation method. FIG. 7 shows an exemplary operating environment in accordance with one embodiment of the present invention. Digital system 700 depicts the components of a basic system in accordance with embodiments of the present invention providing the execution platform for certain hardware-based and software-based functionality. Although specific components are disclosed in system 700 it should be appreciated that such components are examples. That is, embodiments of the present invention are well suited to having various other components or variations of the components recited in system 700. It is appreciated that the components in system 700 may operate with other components other than those presented, and that not all of the components of system 700 may be required to achieve the goals of system 700.

In a typical embodiment, System 700 includes sensor 703, image signal processor (ISP) 705, memory 707, input module 709, central processing unit (CPU) 711, display 713, communications bus 715, and power source 716. Power source 716 supplies power to system 700 and may, for example, be a DC or AC power source. CPU 711 and the ISP 705 can also be integrated into a single integrated circuit die and CPU 711 and ISP 705 may share various resources, such as instruction logic, buffers, functional units and so on, or separate resources may be provided for image processing and general-purpose operations. System 700 can be implemented as, for example, a digital camera, cell phone camera, portable device (e.g., audio device, entertainment device, handheld device), webcam, video device (e.g., camcorder) and the like.

Sensor 703 receives light via a lens 701 and converts the light received into a signal (e.g., digital or analog). According to some embodiments, lens 701 may be permanently attached to the system 700. Alternatively, lens 701 may be detachable and interchangeable with lens of other properties. These properties may include, for example, focal lengths, apertures and classifications. In typical embodiments, lens 701 may be constructed of glass, though alternate materials such as quartz or molded plastics may also be used. Sensor 703 may be any of a variety of optical sensors including, but not limited to, complementary metal-oxide-semiconductor (CMOS) or charge-coupled device (CCD) sensors. Sensor 703 is coupled to communications bus 715 and may provide image data received over communications bus 715. In further embodiments, sensor 703 includes light intensity sensing capability, and the image data received may include data corresponding to the determined intensity of the light in a scene or image.

Image signal processor (ISP) 705 is coupled to communications bus 715 and processes the data generated by sensor 703. More specifically, image signal processor 705 processes data from sensor 702 for storing in memory 707. For example, image signal processor 705 may compress and determine a file format for an image to be stored in within memory 707.

The input module 709 allows the entry of user-input into system 700 which may then, among other things, control the sampling of data by sensor 703 and subsequent processing by ISP 705. Input module 709 may include, but it not limited to, navigation pads, keyboards (e.g., QWERTY), buttons, touch screen controls (e.g., via display 113) and the like.

The central processing unit (CPU) 711 receives commands via input module 709 and may control a variety of operations including, but not limited to, sampling and configuration of sensor 703, processing by ISP 705, and management (e.g., the addition, transfer, and removal) of images and/or video from memory 707. In one embodiment, reference images 717 and programmed instructions may be stored in memory 707. CPU 711 may be configured to execute the plurality of programmed instructions to render a high resolution free view image of said captured scene. For example, CPU 711 may be configured to: receive a requested view point; generate an initial synthesis image based on the plurality of input images 717 in the memory 707; calculate a planar homography corresponding to said plurality of reference view points; optimize said initial synthesis image as a new synthesis image representing a planar image of said captured scene in said request view point based on an interpolation of said plurality of input images and said planar homography; and store the new synthesis image back in memory 707.

According to the present disclosure, a solution has been described for efficient generation of a novel image in high resolution and in full 6DOF. In contrast with general Super Resolution methods that can only treat slight rotation and translation in reference images, the scheme according to the present disclosure can handle scale change and 3D transformation effectively. Furthermore, a novel IBR scheme derived from image SR problem has been disclosed. The scheme can generate free view interpolation for planar structures with higher resolution and less distortion using limited uncontrolled input images that is different from either 3D reconstruction or image stitching based IBR.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A computer implemented method of rendering a free view image of a captured scene, the method comprising:
    accessing a plurality of input images stored in a memory of a computing device and corresponding to a plurality of reference viewpoints, wherein an input image represents a planar image of the captured scene at a respective reference viewpoint;
    receiving a requested viewpoint;
    generating, by a processor of the computing device, an initial synthesis image based on the plurality of input images using a homography transformation of one of the input images and average color intensity values of pixels included in the plurality of input images;
    calculating, by the processor of the computing device, geometric registration parameters and photometric regulation parameters of the plurality of input images, wherein the geometric registration parameters comprise at least one planar homography transformation matrix between the plurality of input images;
    calculating the at least one planar homographic transformation matrix by extracting and matching scale-invariant feature transform (SIFT) points in the initial synthesis image and the plurality of input images in accordance with direct linear transformation (DLT) using a random sample consensus (RANSAC) method;
    calculating photometric regulation parameters in accordance with a linear regression method; and
    generating, by the processor of the computing device, a new synthesis image representing a planar image of the captured scene in the requested viewpoint to refine the initial synthesis image based on an interpolation of the plurality of input images, the geometric registration parameters, and the photometric regulation parameters.

2. The computer implemented method of claim 1, wherein calculating the geometric registration parameters comprises determining a positional relativity between pixels comprised in the initial synthesis image and pixels comprised in the plurality of input images.

3. The computer implemented method of claim 2, wherein determining the positional relativity comprises generating the at least one planar homography transformation matrix relating the plurality of input images.

4. The computer implemented method of claim 1, wherein the photometric regulation parameters corresponds to a relationship between the average color intensity values of the pixels comprised in the initial synthesized image with intensity values of pixels comprised in the plurality of input images.

5. The computer implemented method of claim 1, wherein the new synthesis image comprises initial photometric regulation parameters, wherein the initial photometric regulation parameters are calculated based on the average color intensity values of the pixels included in the plurality of input images.

6. The computer implemented method of claim 1, further comprising:
    iteratively re-calculating the photometric regulation parameters based on the new synthesis image;
    iteratively re-calculating the geometric registration parameters based on the new synthesis image; and
    re-estimating the new synthesis image based on the re-calculated photometric regulation parameters and the re-calculated geometric registration parameters.

7. The computer implemented method of claim 6, wherein the new synthesis image is calculated iteratively according to a Bayesian method.

8. The computer implemented method of claim 6, wherein a distribution of the geometric registration parameters is calculated according to a property of Lie group.

9. The computer implemented method of claim 6, wherein re-calculating the photometric regulation parameters and re-calculating the geometric registration parameters of pixels are performed substantially contemporaneously.

10. The computer implemented method of claim 1, wherein the free view image has a greater resolution than each input image, and wherein the requested viewpoint is substantially different from the reference viewpoints associated with the plurality of input images in full 6 degrees of freedom (6DOF).

11. The computer implemented method of claim 10, wherein the at least one planar homography transformation matrix comprises a full 6DOF planar homography transformation matrix.

12. The computer implemented method of claim 1, wherein the at least one planar homographic transformation matrix comprises at least one 3×3 real matrix with unit determinant and 8-degrees of freedom (DOF) corresponding to a Lie group.

13. The computer implemented method of claim 1, further comprising calculating a joint probability distribution of the at least one planar homographic transformation matrix, the photometric regulation parameters, and the initial synthesis image, wherein generating the initial synthesis image further comprises searching the photometric regulation parameters and the geometric registration parameters based on the joint probability distribution.

14. The computer implemented method of claim 13, further comprising:
    calculating an object function of the joint probability distribution; and
    optimizing the object function in accordance with a bounded quasi-Newton method.

15. The computer implemented method of claim 1, wherein calculating the geometric registration parameters comprises:
    calculating an initial planar homography transformation matrix between the plurality of input images using scale-invariant feature transform (SIFT) matching;

generating the initial synthesis image using the initial planar homography transformation matrix over a selected input image; and deriving a new planar homography transformation matrix between the initial synthesis image and the plurality of input images.

16. The computer implemented method of claim. 1, wherein reference viewpoints associated with the plurality of input images are substantially different in view angles and view depths.

17. The computer implemented method of claim 1, wherein calculating the geometric registration parameters comprises adding Gaussian independent identically distributed (i.i.d.) noise to each dimension of a homogeneous coordinate.

18. The computer implemented method of claim 1, wherein the plurality of input images comprises at least one image of a group of images consisting of:
an image captured by an imaging device;
a computer simulated image;
a cropped portion of an image;
a segmented portion of an image; or
an image extracted from a video file.

19. The computer implemented method of claim 1, wherein generating the synthesis image comprises generating the synthesis image in accordance with a super resolution (SR) method.

20. The computer implemented method of claim 1, wherein the free view image corresponds to at least one of a zoomed-in image, a zoomed-out image, and a rotated image of the captured scene.

21. A system for rendering a high resolution free view image of a captured scene in an image capture device, the system comprising:
the image capture device comprising:
a lens; and
a plurality of shutters,
wherein the image capture device is configured to generate a plurality of input images corresponding to a plurality of reference viewpoints, and
wherein an input image represents a planar image of the captured scene at a respective reference viewpoint;
a memory, communicatively coupled to the image capture device, and configured to store image data corresponding to the plurality of input images and a plurality of programmed instructions; and
a processor, communicatively coupled to the memory, and configured to execute the plurality of programmed instructions to render a high resolution free view image of the captured scene, wherein the processor is configured to:
receive a requested viewpoint;
generate an initial synthesis image based on the plurality of input images in the memory using a homography transformation of one of the input images and average color intensity values of pixels included in the plurality of input images;
calculate geometric registration parameters and photometric regulation parameters corresponding to the plurality of input images;
re-calculate the photometric regulation parameters of the plurality of reference viewpoints based on a new synthesis image;
re-calculate the geometric registration parameters of the plurality of reference viewpoints based on a new synthesis image; and generate a new synthesis image representing a planar image of the captured scene in the requested viewpoint to refine the initial synthesis image based on an interpolation of the initial synthesis image, the geometric registration parameters, and the photometric regulation parameters,
wherein the geometric registration parameters comprise at least one planar homography transformation matrix between the plurality of input images,
wherein the at least one planar homography transformation matrix corresponds to a positional relativity between pixels comprised in the initial synthesis image and pixels comprised in the plurality of input images, and
wherein the photometric regulation parameters corresponds to a relationship between intensity values of pixels comprised in an intensity synthesized image with intensity values of pixels comprised in the plurality of input images.

22. The image capture device of claim 21, wherein the at least one planar homography transformation matrix relates to the plurality of reference viewpoints in the plurality of input images.

23. The image capture device of claim 21, wherein the processor is further configured to optimize the photometric regulation parameters and the geometric registration parameters to generate a free view image representing a planar image of the captured scene in the requested viewpoint.

24. A non-transitory computer readable medium containing program instructions embodied therein for rendering a high resolution free view image of a captured scene, the program instructions comprising:
instructions to access a plurality of input images corresponding to a plurality of reference viewpoints, wherein an input image represents a planar image of the captured scene at a respective reference viewpoint;
instructions to receive a requested viewpoint;
instructions to generate an initial synthesis image based on the plurality of input images using a homography transformation of one of the input images and average color intensity values of pixels included in the plurality of input images;
instructions to calculate geometric registration parameters and photometric regulation parameters corresponding to the plurality of reference viewpoints by calculating a relationship between intensity values of pixels comprised in the intensity synthesized image with intensity values of pixels comprised in the plurality of input images and calculating a positional relativity between pixels comprised in the initial synthesis image and pixels comprised in the plurality of input images, wherein the geometric registration parameters comprise at least one planar homography transformation matrix between the plurality of input images;
instructions to iteratively re-calculate the photometric regulation parameters corresponding to a new synthesis image;
instructions to iteratively re-calculate the geometric registration parameters corresponding to a new synthesis image; and
instructions to generate a new synthesis image representing a planar image of the captured scene in the requested viewpoint to refine the initial synthesis image based on an interpolation of the plurality of input images, the geometric registration parameters, and the photometric regulation parameters.

25. The non-transitory computer readable medium of claim 24, further comprising instructions to repeat the instructions to optimize the new synthesis image to generate the free view image representing a planar image of the captured scene in the requested viewpoint.

* * * * *

UNITED STATES PATENT AND TRADEMARK OFFICE
CERTIFICATE OF CORRECTION

PATENT NO. : 9,824,486 B2
APPLICATION NO. : 14/572524
DATED : November 21, 2017
INVENTOR(S) : Jie Hu et al.

It is certified that error appears in the above-identified patent and that said Letters Patent is hereby corrected as shown below:

In the Claims

Column 15, Lines 7-10, Claim 16, should read:
16. The computer implemented method of claim 1, wherein reference viewpoints associated with the plurality of input images are substantially different in view angles and view depths.

Signed and Sealed this
Tenth Day of July, 2018

Andrei Iancu
*Director of the United States Patent and Trademark Office*